No. 892,396. PATENTED JULY 7, 1908.
R. F. BROOKS.
HEATING APPLIANCE FOR BROODERS.
APPLICATION FILED AUG. 9, 1907.

2 SHEETS—SHEET 1.

WITNESSES: INVENTOR
R. F. Brooks
BY
W. J. FitzGerald
Attorneys

No. 892,396. PATENTED JULY 7, 1908.
R. F. BROOKS.
HEATING APPLIANCE FOR BROODERS.
APPLICATION FILED AUG. 9, 1907.

2 SHEETS—SHEET 2.

WITNESSES:

INVENTOR
R. F. Brooks
BY W. J. FitzGerald & Co
Attorneys

UNITED STATES PATENT OFFICE.

ROSWELL F. BROOKS, OF LAKE CITY, IOWA.

HEATING APPLIANCE FOR BROODERS.

No. 892,396.  Specification of Letters Patent.  Patented July 7, 1908.

Application filed August 9, 1907. Serial No. 387,907.

*To all whom it may concern:*

Be it known that I, ROSWELL F. BROOKS, a citizen of the United States, residing at Lake City, in the county of Calhoun and State of Iowa, have invented certain new and useful Improvements in Heating Appliances for Brooders; and I do hereby declare the following to be a full, clear, and exact description of the invention, such as will enable others skilled in the art to which it appertains to make and use the same.

My invention relates to new and useful improvements in heating appliances for brooders and my object is to provide means for thoroughly heating the interior of the brooder at a minimum amount of expense and trouble.

A further object is to provide means for regulating the height of the heating apparatus above the floor of the brooder to accommodate fowls of various ages.

Other objects and advantages will be hereinafter referred to and more particularly pointed out in the claims.

Figure 1:
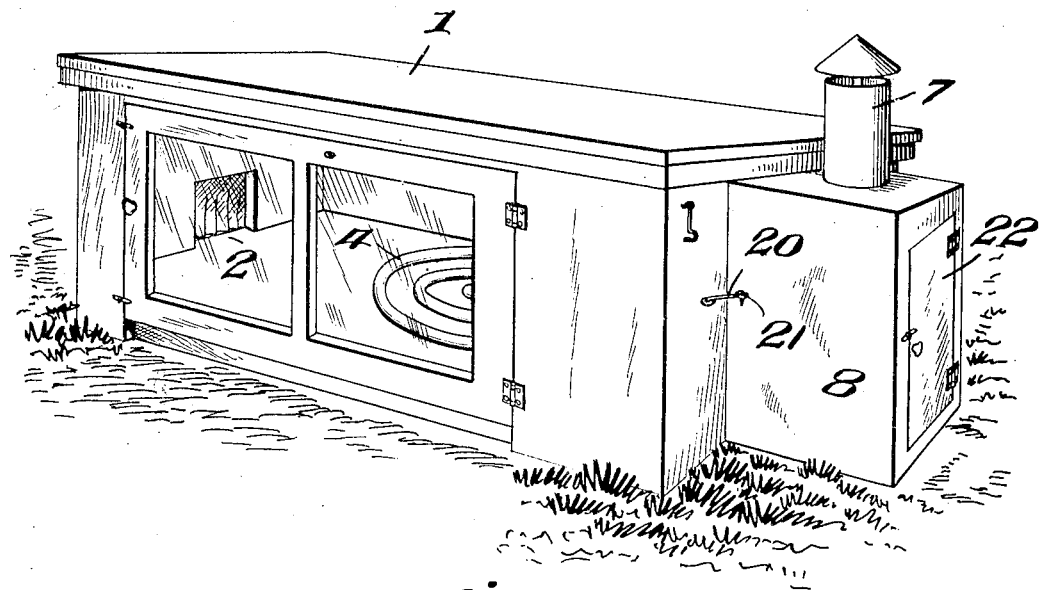
Figure 4:
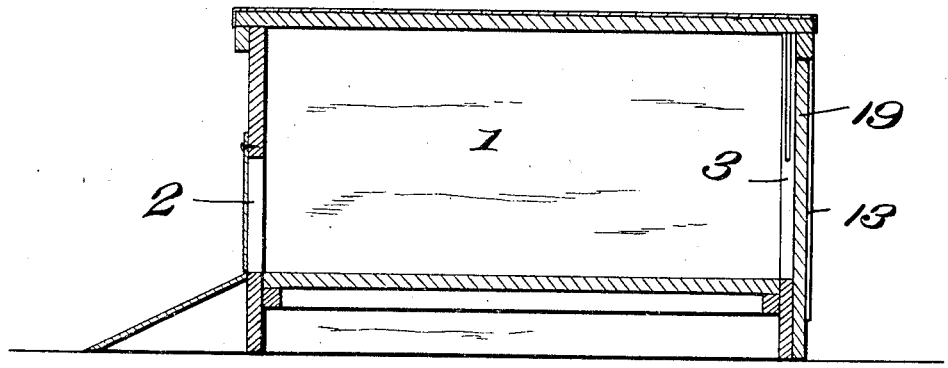
Figure 2:
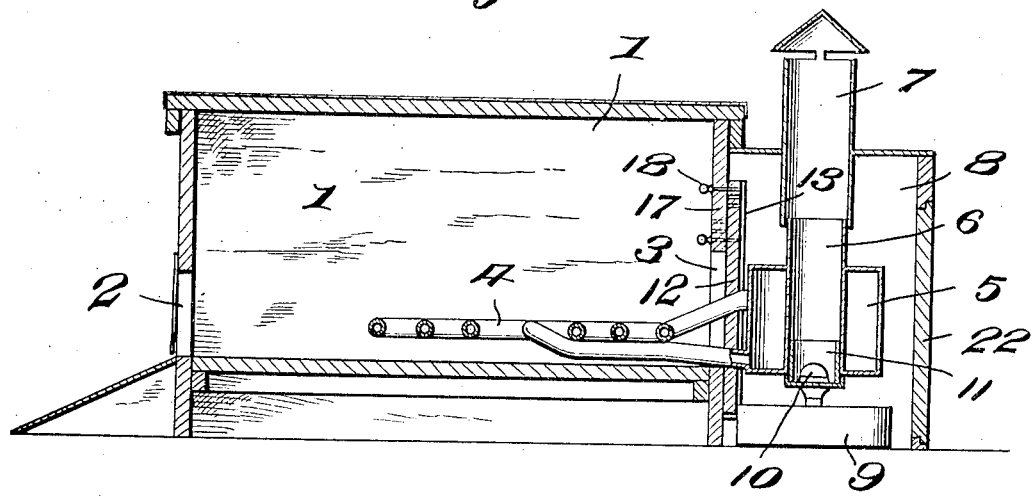
Figure 3:
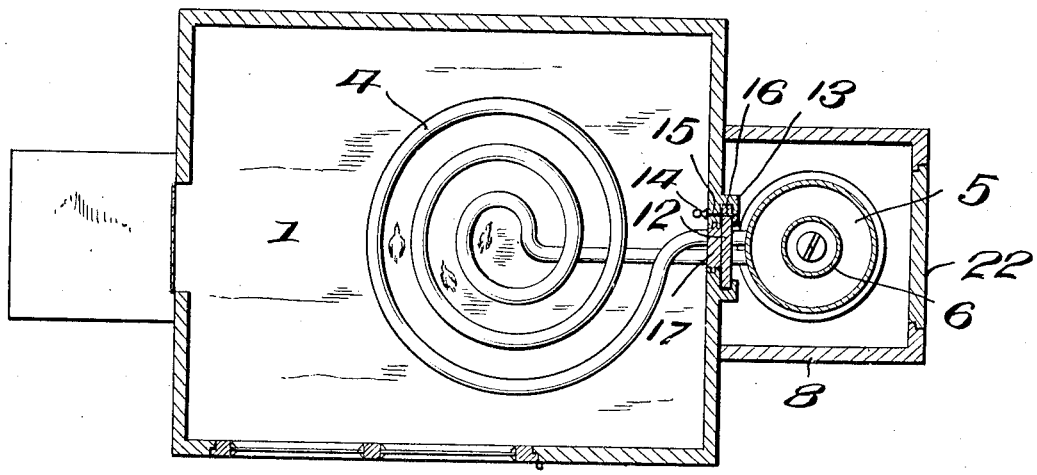

In the accompanying drawings which are made a part of this application, Figure 1 is a perspective view of the brooder, showing my improved heating appliance attached thereto. Fig. 2 is a longitudinal, sectional view thereof. Fig. 3 is a horizontal, sectional view through the brooder and heating appliance, and, Fig. 4 is a sectional view similar to Fig. 2, with the heating appliance removed.

Referring to the drawings in which similar reference numerals designate corresponding parts throughout the several views, 1 indicates the brooder proper, which may be of the usual or any preferred form and designed as a housing for small chicks when the same have been hatched by an incubator, one end of the brooder being provided with an opening 2, through which the fowls may enter or leave the brooder. The opposite end of the brooder 1 is provided with a slot 3, through which is adapted to extend my improved form of coiled heating pipe 4, one end of said pipe entering a drum 5 at its lower edge, while the opposite end of the pipe enters the drum adjacent the upper end thereof, thereby inducing circulation of water through the heating pipes when the water in the drum is heated. A cylinder 6 extends through the central portion of the drum 5 and above the upper edge thereof, the upper end of the cylinder entering a flue 7, carried by a housing 8, so that heat passing through the cylinder will be conveyed to the outer atmosphere.

The water in the drum 5 is heated in any preferred manner, as by disposing a lamp 9 below the drum and introducing the burner 10 of the lamp into the lower end of the cylinder 6, said burner being surrounded by a collar 11, which extends a distance into the cylinder, so that said cylinder and drum may be moved vertically without disturbing the position of the lamp, the collar 11 telescoping with the lower end of the cylinder.

The heating pipe 4 and drum 5 are adapted to be adjusted vertically, so that when very small chickens are placed in the brooder, the heating pipes are to be lowered to a point adjacent the floor of the brooder and, likewise, when the chicks advance in age and size, the heating pipes are to be elevated accordingly, so that the chickens may freely pass below the pipes and at the same time be comfortably warmed, so that they will not crowd together in the brooder and kill each other by smothering, and to readily accomplish this result, the ends of the pipe 4 are entered through a plate 12, which is slidably mounted in ways 13 on one wall of the brooder, so that said plate may be raised or lowered at will, and the plate and parts carried thereby are held in their adjusted position by entering a pin 14 through sockets 15 in the wall of the brooder and into a similar socket 16 in the plate 12, thereby holding the plate in its adjusted position, and by providing a plurality of the sockets 15, it will be seen that the plate and pipe may be variously adjusted, as desired.

The slot 3 extends to the upper edge of the brooder and the upper end of the slot is temporarily closed by means of an insert plate 17, each edge of said plate being provided with a tongue, which is adapted to enter corresponding grooves in the edge walls of the slot, said insert plate being held in position by means of a pin 18, which is entered through a socket in the wall of the brooder and into a registering socket in the upper end of the plate 12.

When the fowls have reached an age when heating of the brooder is not necessary, the heating device may be entirely removed from the brooder, and the slot 3 closed by introducing an auxiliary plate 19 in the ways 13, as best shown in Fig. 4 of the drawings, the housing 8 being removably secured to the brooder 1 in any preferred manner, as by securing the same thereto by means of hooks 20, carried by the brooder, engaging eyes 21 on the housing 8 and the housing is provided with a door 22, whereby access may be had to the lamp and heating drum.

It will thus be seen that I have provided a very cheap and economical form of heating device for brooders and one wherein the heating pipes may be adjusted to various heights above the floor of the brooder to accommodate fowls of different ages and sizes and it will further be seen that I have provided means for removing the heating appliance when the fowls have reached an age when artificial heat is not required, and it will also be seen that I have provided means to readily and quickly secure the heating appliance to the brooder and also to hold the same in its adjusted position.

What I claim is:

1. In a heating appliance for brooders, the combination with a brooder having a slot in one end thereof; of a drum, a coiled pipe extending from said drum, one end of said pipe entering the lower end of the drum and the opposite end of the pipe entering the drum adjacent the upper end thereof, a cylinder extending through said drum, a heating device at the lower end of said cylinder, a collar telescopically mounted in the lower end of said cylinder, whereby the drum may be raised or lowered without disturbing the heating appliance, a plate slidably secured to one wall of the brooder adapted to carry said pipe, and means to engage the plate and adjust the heating pipe in the brooder.

2. A heating appliance of the class described, comprising the combination with a brooder having a slot in one end thereof and ways at each side of said slot; of a plate adjustably mounted in said ways, a pipe carried by said plate and extending into said brooder, a drum fixed to the ends of said pipe and beyond one end of the brooder, a cylinder extending through said drum and above the upper end thereof, a heating appliance below said cylinder, a collar carried by said heating appliance and telescopically mounted in said cylinder, and means to adjustably hold said plate in the ways, whereby the pipe will be correspondingly adjusted in the brooder.

3. In a heating appliance, the combination with a brooder, having a slot in one end thereof and ways at each side of said slot; of a plate mounted in said ways, a heating pipe carried by said plate and extending into said brooder, a drum fixed to the ends of said pipe, the ends of said pipe engaging the drum adjacent its upper and lower ends, respectively, a cylinder extending through said drum and above the upper end thereof, a flue adapted to receive the upper end of the cylinder, a collar telescopically mounted in the lower end of the cylinder, a heating appliance below said cylinder and means to hold said plate in its adjusted position, whereby the heating pipe will be held at various heights in the brooder.

In testimony whereof I have signed my name to this specification in the presence of two subscribing witnesses.

ROSWELL F. BROOKS.

Witnesses:
ARTHUR BRUCE,
R. F. TOWNSEND.